July 15, 1924.

B. H. ALEXANDER

TRACTOR

Filed July 18, 1922

Inventor
Bony H. Alexander,
By Marks & Clerk
Attorney

Patented July 15, 1924.

1,501,639

UNITED STATES PATENT OFFICE.

BONY H. ALEXANDER, OF LEXINGTON, MISSISSIPPI, ASSIGNOR OF SEVEN-TWENTIETHS TO J. PRESTON ROGERS AND FIVE-TWENTIETHS TO L. E. BARR, BOTH OF LEXINGTON, MISSISSIPPI.

TRACTOR.

Application filed July 18, 1922. Serial No. 575,797.

*To all whom it may concern:*

Be it known that I, BONY H. ALEXANDER, a citizen of the United States, residing at Lexington, Holmes County, Mississippi, have invented certain new and useful Improvements in Tractors, of which the following is a specification.

This invention relates to improvements in tractors and more particularly to improvements in mechanism for preventing tractors of the two-wheel drive type from turning turtle.

The primary object of the invention is to furnish means for preventing a tractor from turning over backwards about the axis formed by its rear axle.

A further object of the invention is to provide mechanism for throwing out the clutch of the tractor shortly after the tractor commences tipping motion about the rear axle. This mechanism is designed to hold the clutch in de-clutched position until the mechanism is manually unlatched.

A still further object of the invention is to provide mechanism of this character with an improved suspended leg adapted to contact with the ground when the tractor commences to tip, and this leg functions to operate the mechanism which accomplishes the declutching. This suspended leg forms an important feature of the present invention, as it is so constructed and connected to the anti-tipping mechanism, as to actuate only at desired times. In other words, this leg will drag over logs, stones and the like without causing the declutching of the clutch, and the leg is also free to permit the rear end of the tractor to drop into a rut or the like, without causing the throwing out of the clutch.

Another object of the invention is to provide improved means for connecting the mechanism to the clutch pedal, this means being flexible to permit the operation of the clutch pedal, and being adjustable to accommodate clutch pedals arranged at various heights.

The mechanism is constructed to form an attachment, so that the same may be applied to tractors already built, but it is obvious that the mechanism might be built with and form part of the tractor.

With the foregoing objects outlined and with other objects in view, which will appear as the description proceeds, the invention consists in the novel features hereinafter described in detail, illustrated in the drawing and more particularly pointed out in the appended claims.

Referring to the drawing:

Figure 1 is a side view of the rear portion of a tractor, with the near wheel removed, and showing my improved mechanism connected to the rear axle housing and the clutch pedal.

Fig. 2 is a perspective view of the anti-tipping mechanism.

Fig. 3 is a detail fragmentary view of a portion of this mechanism, illustrating the manner in which the ground engaging leg is normally suspended.

Fig. 4 is a similar view illustrating the position which the leg occupies relatively to the beam when the tractor tips while the leg is arranged in one position.

Fig. 5 is a similar view showing the position of the leg during the tipping motion when the latter takes place while the leg is passing over an obstruction or the like.

Fig. 6 is a similar view showing the leg in the position which it occupies at the commencement of the tipping, when the leg is in a still different position.

In the drawing, 1 designates a tractor having a rear axle housing 2 and a clutch pedal 3. It is to be understood that the tractor may be of any construction as the same need not be modified to accommodate the present invention.

To the rear axle housing I secure my improved clamp consisting of semi-circular sections 4 and 5 having outwardly extending apertured lugs 6 adapted to receive bolts 7, which rigidly secures the clamp in position, so that said clamp will follow the movements of the rear axle housing. The member 5 is provided with depending lugs 8 to which is connected a bar or beam 9, the connection being made by means of a pivot pin 10. The front end of the bar 9 is provided with an eye 11 connected to the lower end of a chain 12. The upper portion of the chain is adjustably connected with a snap hook 13 carried by an eye 14 arranged at the forward end of a lug 15 carried by an arm 16 extending from one end of a bar 17. This bar is preferably fitted with adjustable clamps 18 to permit the same to be attached to the foot pedal 3. When tractors are new, the clutch pedal usually occupies a position at a higher plane than it does when the tractor has been used for some time. In order to take care of these positions, the chain 12 may be adjustably connected to the hook 13 by simply changing the hook from one link of the chain to another. It is also obvious that owing to the flexibility of the chain, the clutch pedal may be depressed without in any way moving the bar 9.

Arranged at the rear end of the bar 9 is an inclined slot 19 through which extends a pin 20 fixed to the depending leg 21. Owing to this slot and pin connection, it will be readily seen that the leg 21 may swing freely while passing over obstructions and the like without causing any movement of the bar 9. The depending leg preferably has its upper end bifurcated and the bar 9 extends between the furcations 22 and 23. A bolt 24 also extends between the furcations and is arranged to cooperate with notches 25, 26 and 27 arranged in the rear end of the bar 9. As best shown in Figs. 1 and 3, the leg 21 normally rides in a position inclined slightly to the vertical, and a stop arm 28 secured to the bar 9, prevents the lower portion of the leg from moving forwardly beyond this position. As illustrated in Fig. 3, the pin 20 occupies the lower end of the slot 19 when the leg is in this position, and this permits the pin 24 to move over the teeth 25, 26 and 27, when the leg is swung about its pivot 20. Assuming that the leg is in the position shown in Figs. 1 and 3, and the tractor commences to turn over backward, the lower end of the leg 21, which normally rides about 1½ inches from the ground, will immediately strike the ground, and thus will cause the pin 20 to ride upwardly and forwardly in the slot 19, until the pin 24 engages the notch 25. Then further backward turning movement of the tractor will cause the bar 9 to swing about the pivot 10, and this will cause the chain 12 to pull down on the clutch pedal and throw the clutch out. The throwing out of the clutch will immediately halt the tendency of the tractor to turn turtle, and in order to maintain the clutch in its declutched position until the operator desires to release the same, I have provided means for locking the bar 9. This means includes ears 29 arranged on the member 4 and connected by a pivot pin 30 to the rear end of a pawl 31. The forward end of this pawl cooperates with the rack teeth 32, and guide members 33 fixed to the pawl extend downwardly for the purpose of guiding the pawl relatively to the bar 9. It will be understood that as the bar 9 moves about the pivot 10 in one direction, the pawl will ride rearwardly over the teeth 32 and will lock the bar 9 in a position to hold the clutch out. In order to release the pawl, the operator simply lifts up on the same, and thus permits the bar 9 to again occupy its normal position.

When the leg 21 is passing over an obstruction or is engaging the ground in such manner as to cause the leg to occupy the plane shown in Fig. 5, the leg can still function properly to cause the declutching of the clutch, for if the tractor attempts to turn turtle at this time, the pin 20 will ride up the slot 19, until the pin 24 engages the notch 26, and this will latch the leg in a fixed position and cause the bar 9 to be actuated by said leg.

As shown in Fig. 6, the notch 27 will receive the pin 24, when the leg is in a plane substantially parallel with the bar 9. Owing to this construction, it is obvious that the leg 21 will actuate the bar 9 regardless of the position which the leg occupies when the tipping movement commences. It is also evident that the leg 21 will swing back to its normal position automatically.

When it is desired to back the tractor or when it is desired to throw the leg 21 out of operation, it is necessary to move said leg into a plane substantially parallel with the rear portion of the bar 9, and to accomplish this, I have provided the furcation 23 with a strap metal or resilient handle portion 34 having a latch 35 adapted to automatically catch on the under side of the bar 9 when the upper portion of the leg 21 is moved forwardly and downwardly by the operator.

It will be noted that when the leg 21 is in its latched position, that is when the latch 35 is connected with the bar 9, the leg is still capable of actuating the bar 9 if the tractor should attempt to tip backward, for in this case as soon as the rear end of the leg 21 engages the ground, it will cause the bar 9 to actuate.

If the leg 21 is in its latched position or is in the position shown in Fig. 6, and the tractor should be bogged in the ground, to a position where the surface of the ground would engage the leg 21 to cause pulling down of the clutch pedal, the bar 9 can be instantly disengaged from the clutch pedal and the chain may be let out a few links, so that the clutch pedal may be actuated without being affected by the bar 9.

In order to cause the leg 21 to function properly when the tractor is moving over ice, concrete or any other hard road surface, I have provided the lower end of the leg 21 with a spur or spike 36 adapted to dig into the road surface.

It may sometimes happen that the tractor will commence to tip, while the leg 21 occupies a position over a rut or the like, and under such circumstances the spike 36 and the leg might continue to move downwardly in said rut until the tractor had tipped to a dangerous position, and in order to prevent this possibility, I have provided the lower end of the leg with diverging arms 37, adapted to strike on the wall or walls at one side of said rut and to prevent the leg 21 from moving downwardly to a dangerous position.

From the foregoing it is believed that the construction, operation and advantages of the invention will be readily understood by those skilled in the art, and it is apparent that various changes may be made in the details illustrated without departing from the spirit of the invention as expressed in the claims.

What I claim and desire to secure by Letters Patent is:

1. The combination with a tractor having a clutch, of means for actuating said clutch when the tractor attempts to turn over backward, said means including a ground-engaging member to cause actuation of said clutch, the lower portion of said member, when the tractor is in normal position and traveling forward, being arranged to elevate incident to its engagement with an obstruction over which the tractor is passing without causing actuation of said clutch.

2. The combination of a tractor having a clutch, means for actuating said clutch, and a ground engaging member pivotally connected to said means and adapted to actuate said means when the tractor attempts to turn over backward, said ground engaging member being arranged to automatically swing upwardly and rearwardly when an obstruction is encountered independently of said means in order to pass over obstructions without actuating said means.

3. A combination as claimed in claim 2 including coacting locking members provided on said member and said means to cause said member to be latched to the means automatically when the tractor attempts to turn over backward.

4. In a mechanism of the character described, a supporting member adapted to be connected to a tractor, a bar pivotally connected to the support member, a flexible connection arranged at the forward end of said bar and adapted to be connected to the clutch pedal of a tractor, a ground engaging leg pivotally connected to said bar, and a stop member arranged on the bar and adapted to prevent said ground engaging member from swinging into a vertical position.

5. In mechanism of the character described, a pivotally mounted lever, means arranged at the forward end of said lever for adjustably connecting said lever to the clutch lever of a tractor, a ground engaging leg, a slot and pin connection connecting the ground engaging leg to the pivotally mounted lever, said pivotally mounted lever being provided with a series of spaced notches, and a pin fixed to said ground engaging member and adapted to cooperate with said notches.

6. In mechanism of the character described a pivotally mounted bar, means for connecting said bar to the clutch pedal of a tractor, a ground engaging leg pivotally connected to said bar, and a sharp spike arranged at the lower end of said leg.

7. A mechanism as claimed in claim 6 in which the lower portion of said leg is provided with diverging arms extending outwardly on the opposite sides of said spike.

8. In combination, a pivotally mounted bar, means provided at the forward end of said bar for connecting the same to the clutch pedal of a tractor, a ground engaging leg pivotally mounted on the rear portion of said bar, and a latch handle mounted on the upper portion of said leg and adapted to cooperate with said bar for holding the leg in cooperative position.

9. The combination with a motor operated tractor having a clutch, of means including a ground engaging member for actuating said clutch when the tractor attempts to turn over backward, the lower portion of said member, when the tractor is in normal position and traveling forward, being free to automatically elevate under the force encountered when striking an obstruction without causing actuation of said clutch.

10. The combination with a motor operated tractor, of means for preventing the tractor from turning over backward, said means including a supporting member connected to the tractor, a ground engaging element, and means connecting the ground engaging element to the supporting member, said last mentioned means when the tractor is in normal position and traveling forward, permitting the lower portion of the ground engaging element to automatically elevate when the ground engaging element encounters an obstruction over which the tractor is passing, without affecting the position of the supporting member.

11. The corbination with a motor actuated tractor, of means for preventing the tractor from turning over backward, said means including a supporting member carried by the tractor, a ground engaging element, means connecting said element to said member and, when the tractor is in normal position and traveling forward, permitting the element to automatically swing freely and its lower portion to elevate when said element encounters an obstruction over which the tractor is passing, and means for positively locking the element to the member when the element is moved in lengthwise direction toward said member.

12. The combination with a tractor, of a supporting member carried by the same and provided with an inclined slot and a series of notches, a ground engaging leg connected to said member by a pivot pin which is freely slidable in said slot, and a pin carried by the leg and engageable with either one of said notches for positively locking the leg to the member when the leg is thrust toward said member.

In testimony whereof I hereunto affix my signature.

BONY H. ALEXANDER.